J. LANGSTAFF.
Stone-Sawing Machinery.

No. 199,160. Patented Jan. 15, 1878.

WITNESSES
Ed. J. Nothingham
A. W. Bright

INVENTOR
James Langstaff
By Leggett & Leggett
ATTORNEYS

UNITED STATES PATENT OFFICE.

JAMES LANGSTAFF, OF CLEVELAND, OHIO.

IMPROVEMENT IN STONE-SAWING MACHINERY.

Specification forming part of Letters Patent No. 199,160, dated January 15, 1878; application filed June 28, 1877.

*To all whom it may concern:*

Be it known that I, JAMES LANGSTAFF, of Cleveland, in the county of Cuyahoga and State of Ohio, have invented certain new and useful Improvements in Machinery for Sawing Stone; and I do hereby declare the following to be a full, clear, and exact description of the invention, such as will enable others skilled in the art to which it pertains to make and use it, reference being had to the accompanying drawings, which form part of this specification.

My invention relates to improvement in machinery for sawing stone; and consists in the combination of devices and appliances hereinafter set forth and claimed.

Figure 1:
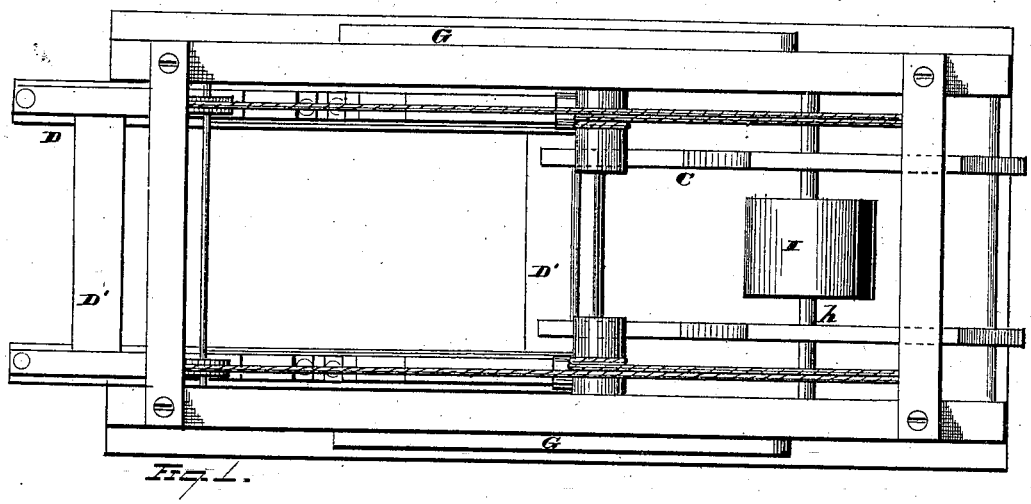
Figure 2:
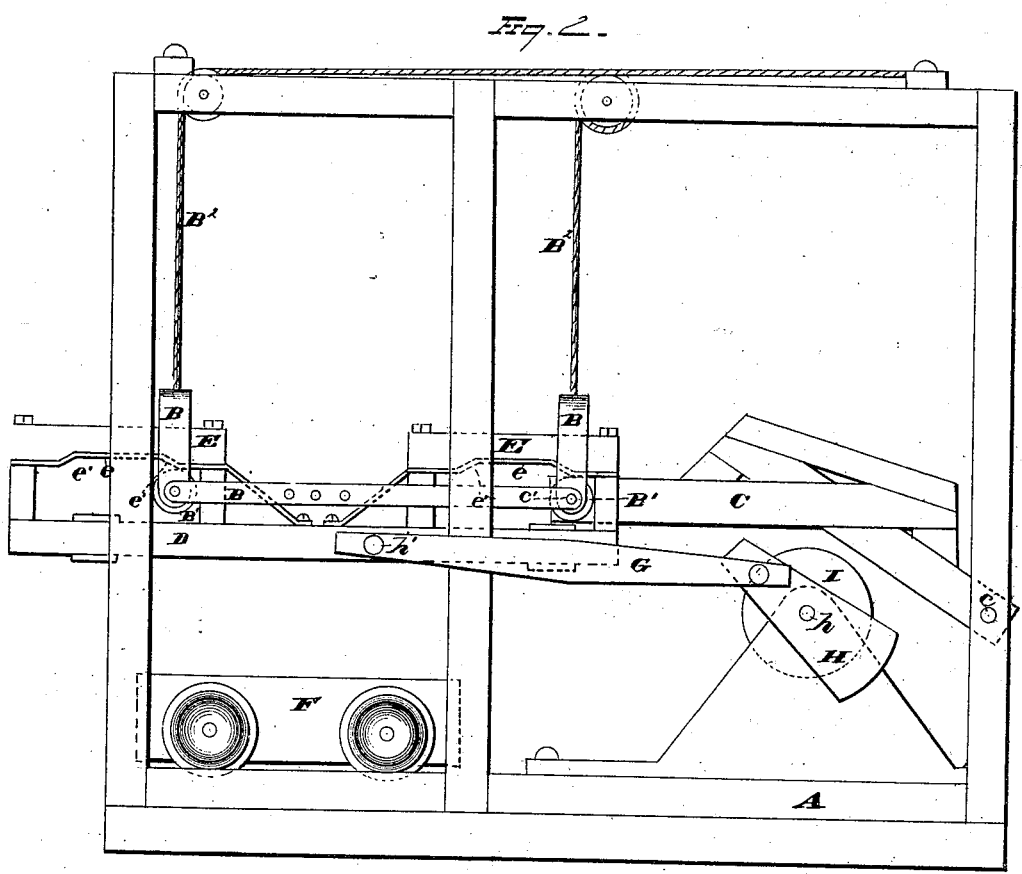

In the drawings, Figure 1 is a plan view, and Fig. 2 a side elevation, of a machine embodying my invention.

Heretofore machines for this purpose have been made with a vertically-moving guide-frame for supporting the saw-frame, and for feeding the saw or saws downward to the work. They have also been provided with a pitman for driving the saw-frame, and with cams upon the saw-frame moving over stationary rollers on the vertically-moving frame or support, or vice versa. It is, however, apparent that the saw-frame, in its movement up and down, would take a general circular course about the crank-shaft, and as the supporting-frame moved vertically the cams and cam-wheels or rollers would, in the descending motion of the saws, be constantly changing their relative positions, thus causing the saws to lift too soon in some portions of the operation and too late in other portions, the result being an ununiform sawing of the stone.

The object of this invention is to so construct the saw-frame and its supporting-frame that both shall move downward along similar arcs, so that the cams and cam-rollers shall always have the same position relative to each other.

A is a suitable frame-work. B is the frame-work which supports the saw-frame. The frame-work B bears the cam-rollers B¹. The frame is suspended by ropes or chains B², and any suitable mechanism is employed for feeding out the said chains as required for feeding the saws to the stone. It is provided with cross-heads or mandrels C' for supporting the saws. Between the saw-mandrels one saw or a gang of saws may stretch, and project therefrom downward to the stone. C is a frame or arm, pivoted to the frame B at one end at the point C, and at the other end pivoted to the frame A at c. This frame C serves to hold the frame B always in the same relation with the saw-frame, so that they shall both rise and fall through the same arc. E are cams rigidly attached to the saw-frame. These cams govern the length of cut of the saw, and also lift the saw at each end of its stroke, so as to permit grit and water to pass into the bottom of the kerf. The straight portions e govern the length of cut, or indicate the distance through which the saw passes while laboring upon the stone at each stroke. The inclined portions e' at each end of the straight portions of the stone cause the saws to lift out at each end of the stroke, to admit grit and water into the bottom of the kerf.

F is the stone-car upon which the stone rests. G is the pitman which drives the saw-frame. I prefer to have a similar pitman upon each side of the frame, though one may be sufficient. The pitman connects, in any suitable way, with the crank H, which is driven by any suitable power, as, for instance, by a belt over a pulley, I. h' is the crank-shaft. The point c is in the same level as the crank-shaft h, and the distance from c to c' is the same as the distance from h to h'.

The operation of the device is substantially as follows: The stone to be sawed is brought upon the car to its proper place beneath the saws, the saws having been lifted by the ropes or chains to a proper height to admit the stone. The frame B is then lowered until the saws rest on the stone. The machinery is then put in motion, the saw-frame D is reciprocated back and forth by the pitman G, the cams E move upon the cam-rollers B¹, and as the saws near the ends of their stroke they are lifted by the inclined portions e' of the cam E. Grit and water will then descend into the bottom of the kerf; and in the return motion of the saw the frame will ride down the cam e', and the straight portions e will support the frame, and give it a straight cut in the stone through the length of that straight portion e. When the frame reaches the other end of its stroke it will rise upon the cam $e'$, and grit and water may again enter the bottom of the kerf and saw. As the stone is sawed the saws are fed downward by the feeding mechanism through the medium of the supporting chains or ropes $B^2$. It is apparent, however, that in the descending motion of the saws the pitman G, having a constant length, causes the frame D to pursue a general course downward along the arc of a circle. Its center is at $h$. Now, if the rollers $B^1$ should descend vertically, it is apparent that the rollers and cams E would be constantly changing their relative positions for every different level of the saw-frame. I therefore pivot the frame B to a connecting-frame, C, which is, in turn, pivoted at $c$ to the frame. This point $c$ being on the same level as the crank-shaft $h$, and the distance from $c$ to $c'$ being the same as the distance from $h$ to $h'$, the frame B will necessarily have to move in the same arc as the frame D, and thereby the rollers $B^1$ will always maintain the same relative position with respect to the cams E, no matter what may be the level of the saw-frame.

It is apparent that the frame C may not be of the precise form shown, nor may the crank-shaft $h$ be located beneath that frame; but the crank may be back of the entire frame, and the pitman made to connect with the end of the saw-frame instead of with the middle, the principle being clearly apparent, namely, that the construction shall be such that the supporting-frame B shall be caused to move downward along the same arc of a circle as that pursued by the frame D, so that the cam-rollers and the cams shall always preserve the same relative position. It is apparent that this might be effected by a properly-curved slot or guide in the uprights of the frame and a stud or pin projecting therein from the frame B. So, also, the cams might be upon the frame B, and the rollers $B^1$ be placed upon the frame D.

What I claim is—

1. A stone-sawing machine provided with a saw-frame for supporting the saws, and driven by a pitman, a supporting-frame for sustaining the saw-frame, one frame provided with a cam and the other with a cam-bearing for governing the saws, the said saw-frame and supporting-frame adapted to move downward along the same arcs, whereby the cam-bearings are always held in the same relation, substantially as and for the purposes described.

2. In a stone-sawing machine, the combination of a saw-frame driven by a crank and pitman, a supporting-frame suspended so as to be fed downward as the stone is sawed, and a pivoted frame or arm, C, for causing the supporting-frame to move downward in the same arc with the saw-frame, substantially as and for the purposes described.

3. In a stone-sawing machine, the combination of a saw-frame, D, provided with cams D', a suspended supporting-frame, B, provided with cam-rollers $B^1$, the pitman and crank G and H, and connecting arm or frame C, substantially as and for the purposes described.

In testimony whereof I have signed my name to this specification in the presence of two subscribing witnesses.

JAMES LANGSTAFF.

Witnesses:
    FRANCIS TOUMEY,
    W. E. DONNELLY.